W. O. LONGENECKER.
ECONOMIZING DEODORIZER.
APPLICATION FILED NOV. 4, 1913.
1,101,942.
Patented June 30, 1914.
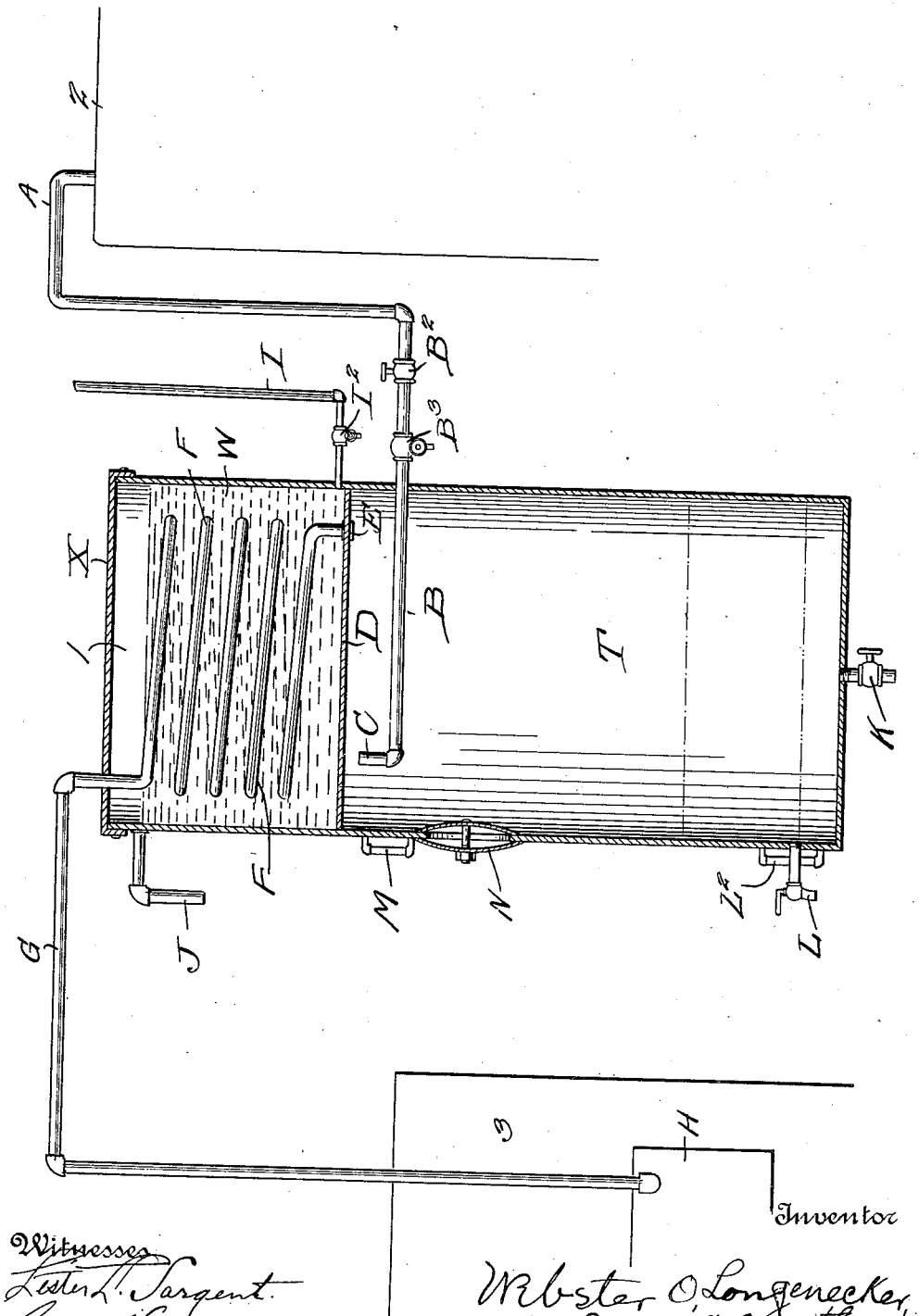

UNITED STATES PATENT OFFICE.

WEBSTER O. LONGENECKER, OF WINCHESTER, INDIANA.

ECONOMIZING DEODORIZER.

1,101,942.  Specification of Letters Patent.  Patented June 30, 1914.

Application filed November 4, 1913. Serial No. 799,087.

*To all whom it may concern:*

Be it known that I, WEBSTER O. LONGE-NECKER, a citizen of the United States, residing at Winchester, in the county of Randolph and State of Indiana, have invented a new and useful Economizing Deodorizer, of which the following is a specification.

My invention relates to deodorizing and tallow collecting apparatus, and has for its object the provision of an improved and effective deodorizer in combination with means for economizing and saving tallow or grease from which offensive odors have been removed.

It is a further object of my invention to provide in connection with such apparatus, improved means for its regulation and operation.

It is also an object of my invention to provide means for safeguarding the apparatus from danger of freezing of the contents of the pipes, and also to afford convenient access to the interior of the device, for its adjustment, repair, etc.

With these and other objects in view, as will appear more clearly from the following description of my apparatus, I provide the economizing deodorizer illustrated in the accompanying drawing, in which the figure shown is a vertical sectional view of my apparatus with parts shown in diagrammatic form, illustrating the apparatus as a whole.

Referring to the above described figure, 1 indicates my new economizing deodorizer and tallow or grease collecting tank; 2 indicates the tallow or rendering tank which supplies material to tank 1; and 3 indicates the furnace or boiler to which gases to be burned are conveyed from tank 1.

A indicates an inverted L-shaped pipe, or a pipe of substantially that form, opening out of the top of the tallow tank 2.

B indicates a horizontal pipe connecting with pipe A and extending into the lower, receiving or economizing chamber T of tank 1, for the collection of tallow or grease. Pipe B connects with and discharges into vertical pipe C, the mouth of which is positioned a little below partition D. A valve $B^2$ and pet cock $B^3$ are provided in pipe B, as shown in the drawing.

The upper, condensing chamber W of my deodorizer tank is, preferably, a water-containing compartment extending from partition D to substantially the top of the tank. A removable cover X is provided, which may be held in place by screws. As a conduit for the material to be condensed I provide a pipe coil F, preferably about 30 feet in length disposed within the condensing chamber W, which is filled with water. The only opening between the condensing chamber W and the lower economizing or receiving chamber of my deodorizer tank is the opening or coil discharge member E in which the mouth of the coil terminates and is fastened. The upper portion of coil F connects with and opens into pipe G which extends to the boiler or furnace 3 and opens into the fire-box H. Water is supplied to the upper, condensing chamber W through pipe I. In pipe I is a pet cock $I^2$, for the escape of water from the condensing chamber W when the apparatus is not in use and it is desirable to draw off the water to prevent freezing. An outlet or overflow pipe J positioned near the top of and opening out of the condensing chamber provides for the discharge of surplus water.

My economizing or receiving chamber T is positioned beneath my condensing chamber W and is provided at the base with a drain cock K through which water collecting in the receiving chamber may be drawn off. At the side but near the base of the tank is a tallow faucet L for drawing off for commercial use tallow that has collected in the receiving chamber in the progress of the operation of my apparatus. Positioned so that its upper portion extends above and its lower portion below the level of the tallow faucet L, I provide a gage $L^2$ by means of which it may be determined when the tallow or grease floating on the water is on a level with and may be drawn off through faucet L. I also provide a gage M, positioned substantially opposite with pipe C, in communication with the receiving chamber a little below partition D, to indicate when the contents of the receiving chamber have risen to a height at which a part of the contents should be withdrawn to prevent backflow. I also provide a manhead N positioned in the side of the tank a short distance below partition D, to afford access to the interior of the tank. This affords a convenient way to fasten the coil to partition D.

The operation of my economizing or tallow-collecting deodorizer apparatus is as follows: Raw material for the process, consisting of offal or cuttings, is placed in the tallow or rendering tank 2, and subjected to heat, in the usual manner. The pipe A which I provide tends to prevent waste from overflow in case the tank is overcrowded. This pipe is of substantially an inverted L-shape, as shown in the drawings, opening vertically out of rendering tank 2 and having its lower end extending vertically downward. Pipe A connects with pipe B, which in turn connects with vertical pipe C, forming a conduit for conveying material from the rendering tank to the lower, economizing or receiving chamber T of my apparatus, substantially as shown in the drawings. A pet cock $B^3$ is provided in pipe B and serves the purpose of indicating, when consulted, when there has been an overflow of tallow, etc. Further passage of material through pipe B may then be stopped by closing valve $B^2$ in pipe B. Material conveyed from the rendering tank 2 is discharged from the mouth of pipe C into the upper portion of the economizing or receiving chamber T below partition D, which has a tendency to condense vapors and steam and send tallow and water to the bottom of the receiving chamber T. Noxious gases, mingled with steam, tallow, etc., in fluid state find an escape through opening E into and through coil F, where they are subjected to the condensing action of the water surrounding coil F. Gases travel thence through pipe G to the firebox H where they are consumed, so that no offensive odor escapes from the apparatus. This constitutes the deodorizing process and mechanism.

Besides its functions as a deodorizer, the apparatus has combined with them the novel function of economizing and preventing loss of useful material which heretofore has not been saved in deodorizing devices. Steam and tallow carried by the noxious gases into coil F and condensed therein are converted from vapor into liquid form and work back through the coil, by force of gravity, and drop into the economizing or receiving chamber T. The result is that water is collected at the bottom of the economizing or receiving chamber T and grease and tallow are collected on top of the water. This may continue until the liquid appears in gage M. This gage is positioned a little below the level of the mouth of pipe C, in communication with the upper portion of chamber T and a little below partition D. The appearance of liquid in gage M gives warning that the contents of the tank should be withdrawn, in part at least. To accomplish this object, water is drained off through cock K until the tallow on the water has fallen to the level of tallow faucet L. This may be determined by consulting gage $L^2$, which is positioned as heretofore described for this purpose. When the tallow has fallen to the level of faucet L, it may be drawn off through that faucet, thus saving useful material instead of its being consumed with noxious gases. In practice I have found that a substantial economy may be effected by this apparatus in consequence of the tallow collected and made available for commercial use instead of being lost as heretofore.

The manhead N is intended to afford a convenient means for getting at the interior of my apparatus, for fastening coil F to opening or coil discharge member E in partition D, and especially for use in case of freezing to obtain access to the coil F through the receiving chamber T.

The word "vapors," as hereinafter used, shall be construed to mean all material flowing or conveyed through pipe A into the receiving chamber whether in gaseous state or otherwise.

What I claim is:

1. A combined deodorizer and tallow-collecting apparatus having a tallow-collecting tank having a condensing chamber; a receiving chamber positioned beneath the condensing chamber; means connected with the condensing chamber for conveying noxious gases therefrom to a firebox; means connected with the receiving chamber for introducing therein vapors from a rendering tank; means for the flow or passage of vapors from the receiving chamber through the condensing chamber and for the return to the receiving chamber by action of gravity condensed vapors; means for the removal of tallow from the aforesaid chamber; means for the removal of water from the aforesaid chamber; and means for the prevention of freezing of fluid in the piping or in the condensing chamber, substantially as described.

2. In a deodorizer, the combination of a tank having an upper condensing chamber and a lower economizing or receiving chamber; a removable cover to the tank; a pipe coil opening out of the receiving chamber and disposed within the condensing chamber; a conduit for conveying noxious gases from the aforesaid pipe coil to a firebox; means for supplying water to the condensing chamber, regulating its height in said chamber and removing it therefrom; means for introducing vapors from a rendering tank into the economizing or receiving chamber and for preventing the overflow and waste of such vapors; means for determining the height of the contents of the economizing or receiving chamber; and independently operated means for drawing off tallow and water from the aforesaid chamber, such means including a tallow faucet, a gage having its upper portion above and its lower portion below the level of the tallow faucet, and a drain cock at the bottom of the receiving chamber, whereby water may be drawn off till the tallow is level with the tallow faucet, and the tallow then withdrawn therethrough, substantially as shown and described.

3. In a deodorizer, the combination of a tank having an upper condensing chamber and a lower economizing or receiving chamber; a pipe coil opening out of the receiving chamber and disposed within the condensing chamber, a conduit for conveying noxious gases from the aforesaid pipe coil to a firebox; means for supplying water to the condensing chamber, regulating its height in said chamber and removing it therefrom; a conduit for introducing vapors from a rendering tank into the economizing or receiving chamber and including means for preventing the overflow and waste of such vapors, the aforesaid conduit including a horizontal pipe opening into the receiving chamber at a position relatively distant from the condensing chamber and a vertical pipe extending upward from the horizontal pipe and having its mouth just below the condensing chamber, whereby the heated contents of the aforesaid conduit may operate to maintain liquid contents of the receiving chamber in a fluid state regardless of low atmospheric temperatures surrounding the tank; and independently operated means for drawing off tallow and water from the receiving chamber and in connection therewith a gage having its upper portion above and its lower portion below the level of a tallow faucet, for the purposes set forth.

In witness whereof I hereunto affix my signature, in the presence of two witnesses.

WEBSTER O. LONGENECKER.

Witnesses:
JOHN W. MACY,
CLIFFORD S. MEIER.

---

Copies of this patent may be obtained for five cents each, by addressing the "Commissioner of Patents, Washington, D. C."